Aug. 16, 1955 E. W. McKINLEY 2,715,416

FLUID PRESSURE VALVE REGULATOR

Filed May 29, 1950

INVENTOR
EDWIN W. McKINLEY
BY Francis D. Ammen
ATTORNEY

United States Patent Office 2,715,416
Patented Aug. 16, 1955

2,715,416

FLUID PRESSURE VALVE REGULATOR

Edwin W. McKinley, Los Angeles, Calif.

Application May 29, 1950, Serial No. 165,056

3 Claims. (Cl. 137—484.2)

This invention relates to fluid pressure regulators such as employed in gas service lines for supplying gas at a substantially uniform pressure to consumers. Pressure regulators of this type usually have a valve controlled by a pressure-sensitive member, such as a diaphragm, in such a way that when the velocity of flow through the regulator increases, the diaphragm functions to move the valve to establish a greater effective area of flow through it, thereby increasing the quantity of gas being delivered through the valve, and maintaining a substantially uniform pressure in the gas delivered to the burners.

In many regulators for this purpose, such as described in my prior Patents No. 2,278,728 and No. 2,305,975, a diaphragm is employed one side of which is exposed to the presence of the gas within a gas chamber in the regulator, the other side of the diaphragm being exposed to atmospheric pressure; and they employ an eduction tube or duct leading into the flowing gas current from the pressure chamber. With that construction, when the gas flow is increased by opening additional burners the eduction duct lowers the pressure in the pressure-chamber thereby enabling the atmospheric pressure, usually assisted by a spring, to effect a further opening of the valve.

The regulator about to be described operates on a different principle, in that one side of the pressure-sensitive member, or diaphragm, is open to the flow chamber through which the gas flows in passing through the regulator, and this invention employs a new method of controlling the regulator valve. In other words, in the present invention the pressure-chamber referred to above is eliminated, with its eduction tube or duct; and the change that occurs in the flow of the current of gas automatically controls the diaphragm by developing a change in static pressure in a gas pocket. This gas pocket is located in a zone near the outer periphery of the pressure-sensitive member or diaphragm, and when the flow rate increases, it develops a loss of pressure in the gas pocket that initiates, and effects, movement of the valve to increase the effective opening past it.

Another object of the invention is to provide a regulator of this type with simple means forming a part of the regulator body itself, for limiting the opening movement of the regulator valve.

Further objects of the invention will appear hereinafter.

The invention consists in the combination of parts to be described hereinafter, all of which contribute to produce an efficient pressure regulator.

Figure 1:
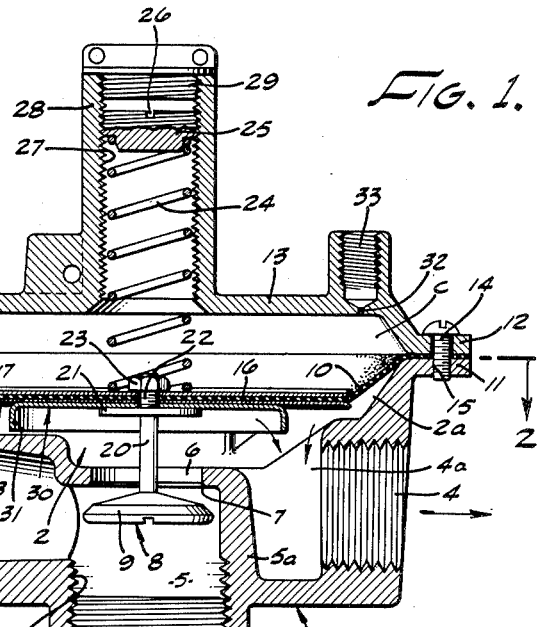
Fig. 1 is a vertical section through a regulator embodying my invention. This section is taken about on the line 1—1 of Fig. 2.
Figure 3:
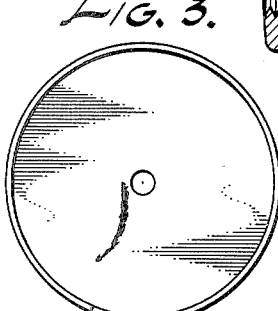
Fig. 3 is a bottom plan of a baffle of my invention; an important element therein.

Referring more particularly to the parts, this regulator includes a body 1 preferably constructed with a dished formed cavity 2 on its upper side, which constitutes part of the flow-chamber for a fluid or gas in passing through the regulator. This flow-chamber includes an inlet 3 and an outlet 4, the former of which leads into a valve-chamber 5 formed in an abutment or nave 5a in the casing; the chamber 5 constitutes part of the flow-chamber and is located just below the valve orifice 6.

The valve orifice 6 is of usual circular form and in the present instance is formed with a slight conical counter-bore 7, which operates as a seat for the single valve closure or valve 8, which is formed with a substantially conical seat-face 9 that rests against the seat 7 when the valve is in its closed position. This valve 8 is connected to a pressure-sensitive member, which in the present instance is a diaphragm 10 of suitable flexible material which is of circular form to conform to the shape of the regulator as viewed in the plan, and the margin of this diaphragm is secured between the flange 11 on the body and a co-extensive flange 12 on the bonnet or cover 13 of the regulator. This cover is of inverted dish form and is secured to the body by means of any suitable fasteners, such as the machine screws 14, the threads of which are received in tapped openings 15 in the lower flange.

On its upper side the diaphragm is provided with a metal plate 16 of disc form the outer edge of which is slightly turned upwardly to form a rudimentary flange 17, the under face of which is curved so as to insure that the diaphragm will not be constantly bent around a sharp edge when the diaphragm is moving up or down.

Figure 2:
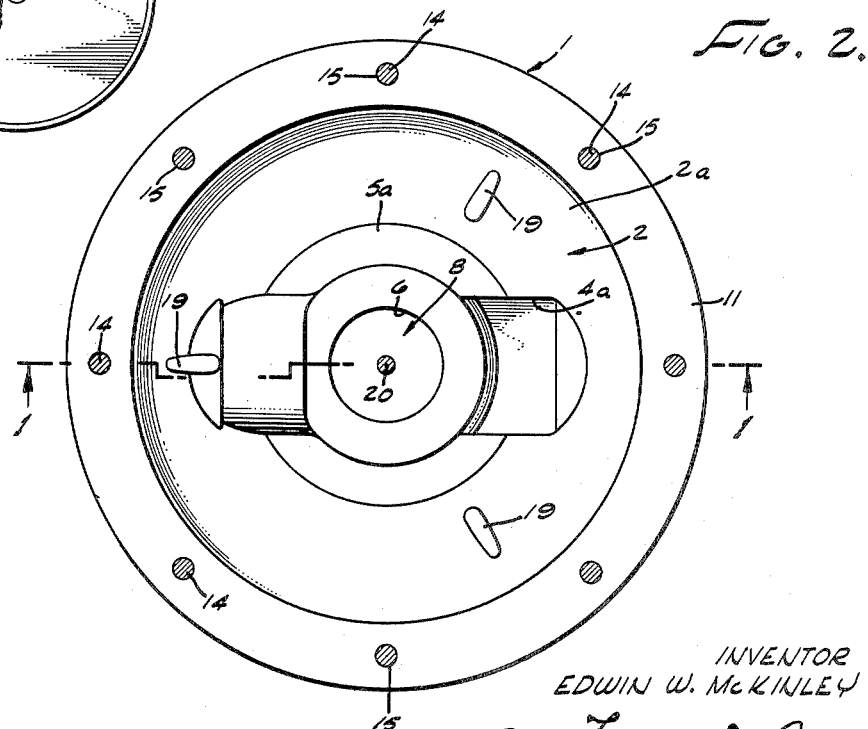
Fig. 2 is a horizontal plan section taken on the line 2—2 of Fig. 1. This view actually shows the body in plan.

A similar disc 18 is provided on the under side of the diaphragm and when the valve is in its full open position, as shown in Fig. 1, the edge of this bottom disc rests upon the upper faces of a plurality of abutments 19. In the present instance there are three of these abutments disposed 120 degrees apart, see Fig. 2. The valve closure 8 has an upwardly extending stem 20 which just below the diaphragm is provided with a collar 21, which may be made integral with the stem 20, if desired, or made as a separate piece. Above the collar 21, the stem 20 is formed into a threaded pintle 22 which projects up through aligning openings in the discs 16 and 18 and the diaphragm. Its upper end is provided with a clamping nut 23.

Adjustable means is provided for exerting a light yielding pressure downwardly on the diaphragm at or near its center and for this purpose I prefer to use a light coil spring 24, the upper end of which thrusts against an adjustable threaded plug 25, which has a transverse cut 26 for enabling the same to be adjusted up or down by means of an ordinary screw driver. The edge of this plug 25 is threaded to mesh with the threads 27 on the inner face of the tubular neck 28 that houses the spring, and the upper end of this neck is closed by a suitable screw cap 29.

In order to enable the diaphragm to be moved automatically when the rate of flow of gas through the regulator changes, I provide a deflector means 30 on the under side of the diaphragm. In the present instance, this deflector seats against the under side of the disc 18. It is preferably of shallow cup form presenting a downwardly extended peripheral rim or flange 31. This deflector is preferably of substantially circular form, attached at the center of the diaphragm, and is of sufficiently large diameter to enable its flange 31, at the point where it is adjacent to the outlet, to project down into the path of the gas that flows radially from the valve orifice after rising through the valve orifice 6.

This regulator operates on a novel principle and in such a way that as the gas flows to the outlet, it is deflected by the deflector, downwardly under the flange 31. As the gas emerges into the flow-chamber, just above the valve orifice, it flows in a general radial direction from the orifice with, of course, the highest velocity being developed in a vertical plane passing through the axis of the outlet, and through the outlet duct 4a leading to the outlet 4. The flange or rim on the deflector, preferably extends at right angles to the plane of the middle portion of the diaphragm. The presence of this downwardly projecting rim has the effect of developing or defining a static pressure-chamber 2a in the upper and outer portion of the flow-chamber, and the pressure in this chamber is exerted in a substantially annular zone extending substantially all the way around the diaphragm toward its margin.

The optimum effect for the deflector appears to be attained when a portion of its rim lies about midway across the outlet duct 4a that leads down from the flow chamber 2 to the outlet 4.

The mode of operation of the regulator as controlled by the deflector is substantially as follows:

Supposing, by way of example, that a consumer to which this gas is supplied has two burners lighted and in operation; under these circumstances a certain quantity of gas would be passing under the diaphragm and on to the outlet. Now if, for example, the consumer opens and lights two more burners, then the pressure in the line running from the outlet to the burners will become considerably reduced; whereupon an increased velocity of flow will be immediately developed under the cup or deflector 30. The effect of this is to entrain or educt gas from the static-pressure chamber 2a, and this reduces the pressure of gas on the under side of the deflector, whereupon the atmospheric pressure in the chamber C above the diaphragm will cause the diaphragm to descend slightly until equilibrium is established. This will open the valve further and give an increased effective area of flow past the valve closure. This chamber C is vented to the atmosphere through a small vent 32. This vent is usually placed at the bottom of a tapped, upwardly projecting nipple 33, which adapts the regulator to be used when desired in a control system that operates to control the regulator with a pressure higher or lower than atmospheric pressure. This would usually be accomplished with compressed air or some other medium, piped to the nipple 33.

The regulator body may be provided with an alternate inlet 3a, closed by an interchangeable plug 34. If this inlet is to be used, as being more convenient in the pipe fitting plan, the plug would be removed and applied in the other inlet 3.

Many other embodiments of the invention may be resorted to without departing from the spirit of the invention.

I claim as my invention:

1. In a fluid regulator, the combination of a body having a cavity on its upper side, and having a flow-chamber with an inlet and an outlet at the underside of said body, a dished cover attached to the body with a cavity on its underside forming a pressure-chamber therein, a pressure controlled diaphragm between the pressure-chamber and the flow-chamber disposed in a substantially horizontal plane, said body having a valve-orifice in the flow-chamber below the diaphragm, a valve below the valve orifice and seating at the valve orifice by an upward movement, resilient means thrusting downwardly against the diaphragm, said body having an outlet-duct extending down from the flow-chamber to said outlet, a disc on the upper side of the diaphragm the edge whereof projects to a point adjacent to the outer wall of said outlet-duct, and an inverted cup-form baffle attached on the underside of the diaphragm with a marginal flange projecting down to a substantial depth across the mouth of said outlet-duct, said projecting flange defining a pressure pocket in the cavity of said body adjacent the margin of said diaphragm and coacting with the valve body to direct the flow of the fluid from said orifice past the pressure pocket into said outlet-duct in such a manner as to reduce the pressure in said pocket proportionately to the rate of increased flow of the fluid flowing from the outlet.

2. In a fluid regulator, the combination of a casing having a body with a dished cavity on its upper side, a dished cover on said body over said cavity vented to the atmosphere and defining a counterbalancing pressure-chamber, a diaphragm secured between said body and said cover, said body having an inlet, an outlet, an outlet-duct leading down from the cavity to the outlet, and a valve orifice between said inlet and said outlet-duct, a single valve-closure below said valve orifice disposed substantially in line with the central axis of the diaphragm and mounted for movement therewith so that the fluid flows from said inlet upwardly past said valve-closure toward the diaphragm, disc means on both sides of said diaphragm including an upper disc having its peripheral edge disposed adjacent the outer wall of said outlet duct, one of said discs including deflector means mounted for movement with said diaphragm and having a part projecting down to a substantial depth across the mouth of said outlet-duct, said projecting part defining a pressure pocket in said dished cavity adjacent the margin of said diaphragm and coacting with the valve body to direct the flow of the fluid from said orifice past the pressure pocket into said outlet-duct in such a manner as to reduce the pressure in said pocket proportionately to the rate of increased flow of the fluid flowing from the outlet.

3. In a fluid regulator, the combination of a casing having an inlet, an outlet, a flow-chamber between said inlet and outlet, a valve orifice in said flow-chamber, an outlet duct extending downwardly from said flow-chamber to said outlet, a pressure-chamber above said flow-chamber, a pressure-sensitive diaphragm separating the pressure-chamber from the flow-chamber, a valve-closure member below said valve orifice connected with said diaphragm for movement therewith toward and away from said valve orifice, disc means on both sides of said diaphragm, the upper disc having a rounded edge for engaging said diaphragm during the movement of the latter, and a lower deflector disc disposed below said diaphragm and mounted for movement therewith, said deflector including a depending flange projecting down to a substantial depth substantially midway across the mouth of said outlet-duct and defining a pressure pocket within said casing adjacent the lower margin of said diaphragm, said flange coacting with said casing to direct the flow of the fluid from said orifice past the pressure pocket into said outlet-duct in such a manner as to reduce the pressure in said pocket proportionately to the rate of increased flow of the fluid flowing from said outlet.

References Cited in the file of this patent

UNITED STATES PATENTS

| Number | Name | Date |
| --- | --- | --- |
| 509,401 | Scott | Nov. 28, 1893 |
| 1,378,026 | Hansen | May 17, 1921 |
| 1,544,195 | Stewart | June 30, 1925 |
| 2,103,576 | Dockson | Dec. 28, 1937 |
| 2,288,297 | Naiman | June 30, 1942 |
| 2,302,284 | Abbott | Nov. 17, 1942 |
| 2,309,405 | Matteson | Jan. 26, 1943 |
| 2,380,459 | Niesemann | July 31, 1945 |
| 2,389,412 | Carlton | Nov. 20, 1945 |
| 2,389,413 | Carlton | Nov. 20, 1945 |
| 2,486,899 | Williams | Nov. 1, 1949 |

FOREIGN PATENTS

| Number | Country | Year |
| --- | --- | --- |
| 674 | Great Britain | 1868 |
| 1,980 | Great Britain | 1873 |
| 246,296 | Italy | 1928 |